United States Patent
Khan et al.

(10) Patent No.: US 10,196,934 B2
(45) Date of Patent: Feb. 5, 2019

(54) ROTOR SUPPORT SYSTEM WITH SHAPE MEMORY ALLOY COMPONENTS FOR A GAS TURBINE ENGINE

(71) Applicant: General Electric Company, Schenectady, NY (US)

(72) Inventors: Esuff Khan, Bangalore (IN); Shivaram Ac, Bangalore (IN); Vidyashankar Ramasastry Buravalla, Bangalore (IN); Shuvajyoti Ghosh, Bangalore (IN); Akash Joshi, Bangalore (IN)

(73) Assignee: General Electric Company, Schenectady, NY (US)

( * ) Notice: Subject to any disclaimer, the term of this patent is extended or adjusted under 35 U.S.C. 154(b) by 704 days.

(21) Appl. No.: 15/041,136

(22) Filed: Feb. 11, 2016

(65) Prior Publication Data
US 2017/0234157 A1    Aug. 17, 2017

(51) Int. Cl.
*F01D 25/16* (2006.01)
*F01D 21/00* (2006.01)
(Continued)

(52) U.S. Cl.
CPC ........... *F01D 25/164* (2013.01); *F01D 21/00* (2013.01); *F01D 21/045* (2013.01); *F01D 21/08* (2013.01);
(Continued)

(58) Field of Classification Search
CPC ........ F01D 21/00; F01D 21/045; F01D 21/08; F01D 25/162; F01D 25/164; F05D 2220/32; F05D 2240/24; F05D 2240/54; F05D 2240/60; F05D 2240/242; F05D 2240/91; F05D 2260/15; F05D 2300/173;
(Continued)

(56) References Cited

U.S. PATENT DOCUMENTS 6,109,022 A   8/2000 Allen et al.
6,240,719 B1  6/2001 Vondrell et al.
(Continued)

OTHER PUBLICATIONS

Copy of Extended European Search Report and Opinion issued in connection with corresponding EP Application No. 17155175.7 dated Jun. 22, 2017.
(Continued)

*Primary Examiner* — Igor Kershteyn
(74) *Attorney, Agent, or Firm* — General Electric Company; Pamela Kachur (57) ABSTRACT

A rotor support system for a gas turbine engine may generally include a bearing assembly and a load reduction member configured to be coupled between the bearing assembly and a support frame of the engine. The load reduction member may include a fuse portion configured to fail when a load transmitted through the load reduction member exceeds a predetermined load threshold. The system may also include a load recoupling member provided between the bearing assembly and the support frame. The load recoupling member may be formed from a super-elastic shape memory alloy that allows the load recoupling member to undergo recoverable deformation without failing when the fuse portion fails such that the load recoupling member maintains a mechanical connection between the bearing assembly and the support frame.

20 Claims, 7 Drawing Sheets

(51) Int. Cl.
*F01D 21/04* (2006.01)
*F01D 21/08* (2006.01)

(52) U.S. Cl.
CPC ........ *F01D 25/162* (2013.01); *F05D 2220/32* (2013.01); *F05D 2240/24* (2013.01); *F05D 2240/242* (2013.01); *F05D 2240/54* (2013.01); *F05D 2240/60* (2013.01); *F05D 2240/91* (2013.01); *F05D 2260/15* (2013.01); *F05D 2300/173* (2013.01); *F05D 2300/174* (2013.01); *F05D 2300/1723* (2013.01); *F05D 2300/505* (2013.01)

(58) Field of Classification Search
CPC ......... F05D 2300/174; F05D 2300/505; F05D 2300/1723
See application file for complete search history.

(56) References Cited

U.S. PATENT DOCUMENTS

| | | | |
|---|---|---|---|
| 6,428,634 B1 * | 8/2002 | Besselink | C22C 19/03 148/402 |
| 6,491,497 B1 | 12/2002 | Allmon et al. | |
| 6,796,408 B2 | 9/2004 | Sherwin et al. | |
| 7,097,413 B2 | 8/2006 | VanDuyn | |
| 7,669,799 B2 * | 3/2010 | Elzey | B32B 3/28 244/123.12 |
| 8,167,531 B2 | 5/2012 | Mollmann et al. | |
| 8,403,634 B2 | 3/2013 | Arness et al. | |
| 8,430,622 B2 | 4/2013 | Webster et al. | |
| 8,662,756 B2 | 3/2014 | Care et al. | |
| 8,986,146 B2 | 3/2015 | Gallet | |
| 9,140,137 B2 | 9/2015 | Mayer et al. | |
| 2006/0269357 A1 | 11/2006 | Webb | |
| 2008/0181763 A1 * | 7/2008 | Webster | F01D 21/045 415/9 |
| 2009/0185768 A1 | 7/2009 | Mons et al. | |

OTHER PUBLICATIONS

Ghosh, S., et al., Rotor support system having a shape memory alloy, GE Co-Pending U.S. Appl. No. 15/811,169, filed Nov. 13, 2017.

Ghosh, S., et al., Support system having shape memory alloys, GE Co-Pending U.S. Appl. No. 15/823,631, filed Nov. 28, 2017.

* cited by examiner

ROTOR SUPPORT SYSTEM WITH SHAPE MEMORY ALLOY COMPONENTS FOR A GAS TURBINE ENGINE

FIELD OF THE INVENTION

The present subject matter relates generally to gas turbine engines and, more particularly, to a rotor support system for a gas turbine engine having one or more shape memory alloy components.

BACKGROUND OF THE INVENTION

Gas turbine engines typically include a rotor assembly, a compressor, and a turbine. The rotor assembly includes a fan that has an array of fan blades extending radially outward from a rotor shaft. The rotor shaft transfers power and rotary motion from the turbine to both the compressor and the fan and is supported longitudinally using a plurality of bearing assemblies. Additionally, the rotor assembly has an axis of rotation that passes through a rotor center of gravity. Known bearing assemblies include rolling elements and a paired race, wherein the rolling elements are supported within the paired race. To maintain a rotor critical speed margin, the rotor assembly is typically supported on three bearing assemblies, one of which is a thrust bearing assembly and two of which are roller bearing assemblies. The thrust bearing assembly supports the rotor shaft and minimizes axial and radial movement of the rotor shaft assembly. The remaining roller bearing assemblies support radial movement of the rotor shaft.

During operation of the engine, a fragment of one of the fan blades may become separated from the remainder of the blade. Accordingly, a substantial unbalanced rotary load may be created within the damaged fan and must be carried substantially by the fan shaft bearings, the fan bearing supports, and the fan support frames.

To minimize the effects of potentially damaging abnormal unbalanced loads, known gas turbine engines include support components for the fan rotor support system that are sized to provide additional strength. However, increasing the strength of the support components undesirably increases an overall weight of the engine and decreases an overall efficiency of the engine when the engine is operated without substantial rotor imbalances.

Other known engines include a bearing support that includes a mechanically weakened section, or primary fuse, that decouples the fan rotor from the fan support system. During such events, the fan shaft seeks a new center of rotation that approximates that of its unbalanced center for gravity. This fuse section, in combination with a rotor clearance allowance, is referred to as a load reduction device, or LRD. The LRD reduces the rotating dynamic loads in the fan support system. However, with conventional LRDs, the fan rotor is permanently decoupled from the fan rotor support system when the primary fuse fails. As a result, subsequent operation of the gas turbine engine may be significantly impacted.

Accordingly, an improved rotor support system that is configured to accommodate unbalanced or increased loading conditions without resulting in a permanent decoupling of the fan rotor from the rotor support system would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a rotor support system for a gas turbine engine, wherein the engine includes a support frame. The system may generally include a bearing assembly and a load reduction member configured to be coupled between the bearing assembly and the support frame of the engine. The load reduction member may include a fuse portion configured to fail when a load transmitted through the load reduction member exceeds a predetermined load threshold. The system may also include a load recoupling member provided between the bearing assembly and the support frame. The load recoupling member may be formed from a super-elastic shape memory alloy that allows the load recoupling member to undergo recoverable deformation without failing when the fuse portion fails such that the load recoupling member maintains a mechanical connection between the bearing assembly and the support frame.

In another aspect, the present subject matter is directed to a rotor support system for a gas turbine engine, wherein the engine includes a support frame. The system may generally include a first bearing assembly and a second bearing assembly spaced axially apart from the first bearing assembly. The first bearing assembly may include a first bearing and a first outer bearing housing extending radially outwardly from the first bearing. The second bearing assembly may include a second bearing and a second outer bearing housing extending radially outwardly from the second bearing. The system may also include a load reduction member configured to be coupled between the first bearing assembly and the support frame of the gas turbine engine. The load reduction member may include a fuse portion configured to fail when a load transmitted through the load reduction member exceeds a predetermined load threshold. Additionally, the first and second outer bearing housings may be formed from a super-elastic shape memory alloy that allows the first and second outer bearing housings to undergo recoverable deformation without failing when the fuse portion fails.

In a further aspect, the present subject matter is directed to a gas turbine engine. The engine may include a rotor shaft, a support frame spaced radially from the rotor shaft and a rotor support system configured to support the rotor shaft relative to the support frame. The rotor support system may generally include a bearing assembly and a load reduction member configured to be coupled between the bearing assembly and the support frame. The load reduction member may include a fuse portion configured to fail when a load transmitted through the load reduction member exceeds a predetermined load threshold. The system may also include a load recoupling member provided between the bearing assembly and the support frame. The load recoupling member may be formed from a super-elastic shape memory alloy that allows the load recoupling member to undergo recoverable deformation without failing when the fuse portion fails such that the load recoupling member maintains a mechanical connection between the bearing assembly and the support frame.

These and other features, aspects and advantages of the present invention will be better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a rotor support system for supporting a rotor shaft of a gas turbine engine relative to a corresponding support frame of the engine. Specifically, in several embodiments, the system may include a bearing assembly and a load reduction member coupled between the bearing assembly and the support frame of the engine. The load reduction member may include a fuse portion configured to fail when an excessive load is transmitted through the member. In addition, the system may include a load recoupling member that is configured to maintain a mechanical connection between the bearing assembly and the support frame when the fuse portion of the load reduction member fails. For example, in accordance with aspects of the present subject matter, the load recoupling member may be formed from a super-elastic shape memory alloy that allows the load recoupling member to provide a high support stiffness under low or reduced loading conditions and low support stiffness under high or increased loading conditions. In particular, the properties of the shape memory alloy may allow the load recoupling member to plastically deform or otherwise undergo recoverable deformation under high loads (e.g., loads sufficient to result in failure of the fuse portion of the load reduction member) without failing, thereby allowing the load recoupling member to absorb/dampen the increased loads while maintaining a mechanical connection between the bearing assembly and the support frame. Thereafter, during windmill, the properties of the shape memory alloy may allow the load recoupling member to regain its original shape and, thus, provide a desired amount of support stiffness between the bearing assembly and the support frame.

Figure 1:
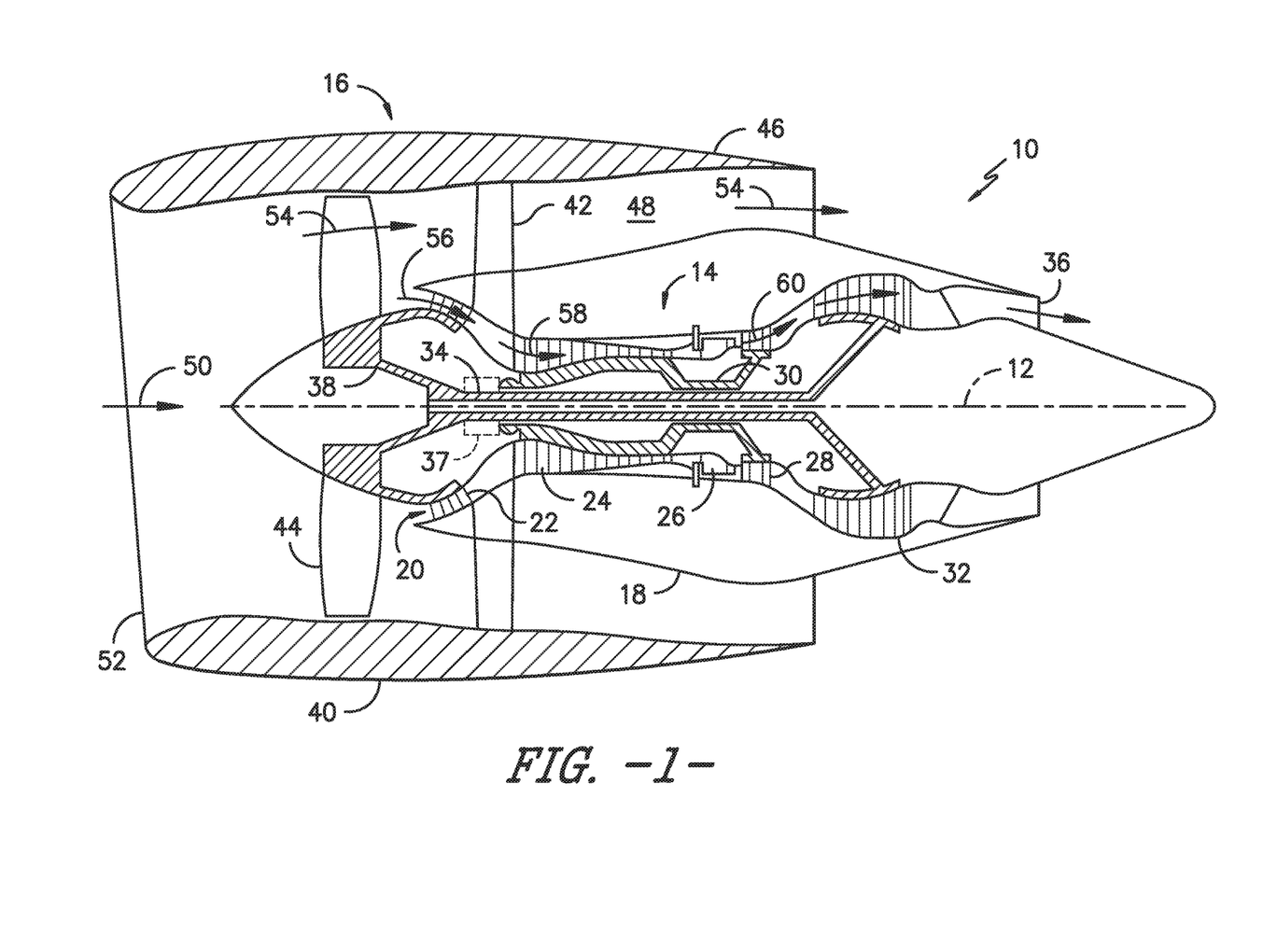
FIG. 1 illustrates a cross-sectional view of one embodiment of a gas turbine engine that may be utilized within an aircraft in accordance with aspects of the present subject matter.

Referring now to the drawings, FIG. 1 illustrates a cross-sectional view of one embodiment of a gas turbine engine 10 that may be utilized within an aircraft in accordance with aspects of the present subject matter, with the engine 10 being shown having a longitudinal or axial centerline axis 12 extending therethrough for reference purposes. In general, the engine 10 may include a core gas turbine engine (indicated generally by reference character 14) and a fan section 16 positioned upstream thereof. The core engine 14 may generally include a substantially tubular outer casing 18 that defines an annular inlet 20. In addition, the outer casing 18 may further enclose and support a booster compressor 22 for increasing the pressure of the air that enters the core engine 14 to a first pressure level. A high pressure, multi-stage, axial-flow compressor 24 may then receive the pressurized air from the booster compressor 22 and further increase the pressure of such air. The pressurized air exiting the high-pressure compressor 24 may then flow to a combustor 26 within which fuel is injected into the flow of pressurized air, with the resulting mixture being combusted within the combustor 26. The high energy combustion products are directed from the combustor 26 along the hot gas path of the engine 10 to a first (high pressure) turbine 28 for driving the high pressure compressor 24 via a first (high pressure) drive shaft 30, and then to a second (low pressure) turbine 32 for driving the booster compressor 22 and fan section 16 via a second (low pressure) drive shaft 34 that is generally coaxial with first drive shaft 30. After driving each of turbines 28 and 32, the combustion products may be expelled from the core engine 14 via an exhaust nozzle 36 to provide propulsive jet thrust.

Additionally, as shown in FIG. 1, the fan section 16 of the engine 10 may generally include a rotatable, axial-flow fan rotor assembly 38 that is configured to be surrounded by an annular fan casing 40. It should be appreciated by those of ordinary skill in the art that the fan casing 40 may be configured to be supported relative to the core engine 14 by a plurality of substantially radially-extending, circumferentially-spaced outlet guide vanes 42. Additionally, a bearing support frame 108 (FIG. 2) may extend radially inwardly from the outlet guide vanes 42. As such, the fan casing 40 may enclose the fan rotor assembly 38 and its corresponding fan rotor blades 44. Moreover, a downstream section 46 of the fan casing 40 may extend over an outer portion of the core engine 14 so as to define a secondary, or by-pass, airflow conduit 48 that provides additional propulsive jet thrust.

It should be appreciated that, in several embodiments, the second (low pressure) drive shaft 34 may be directly coupled to the fan rotor assembly 38 to provide a direct-drive configuration. Alternatively, the second drive shaft 34 may be coupled to the fan rotor assembly 38 via a speed reduction device 37 (e.g., a reduction gear or gearbox) to provide an indirect-drive or geared drive configuration. Such a speed reduction device(s) may also be provided between any other suitable shafts and/or spools within the engine as desired or required.

During operation of the engine 10, it should be appreciated that an initial air flow (indicated by arrow 50) may enter the engine 10 through an associated inlet 52 of the fan casing 40. The air flow 50 then passes through the fan blades 44 and splits into a first compressed air flow (indicated by arrow 54) that moves through conduit 48 and a second compressed air flow (indicated by arrow 56) which enters the booster compressor 22. The pressure of the second compressed air flow 56 is then increased and enters the high pressure compressor 24 (as indicated by arrow 58). After mixing with fuel and being combusted within the combustor 26, the combustion products 60 exit the combustor 26 and flow through the first turbine 28. Thereafter, the combustion products 60 flow through the second turbine 32 and exit the exhaust nozzle 36 to provide thrust for the engine 10.

Figure 2:
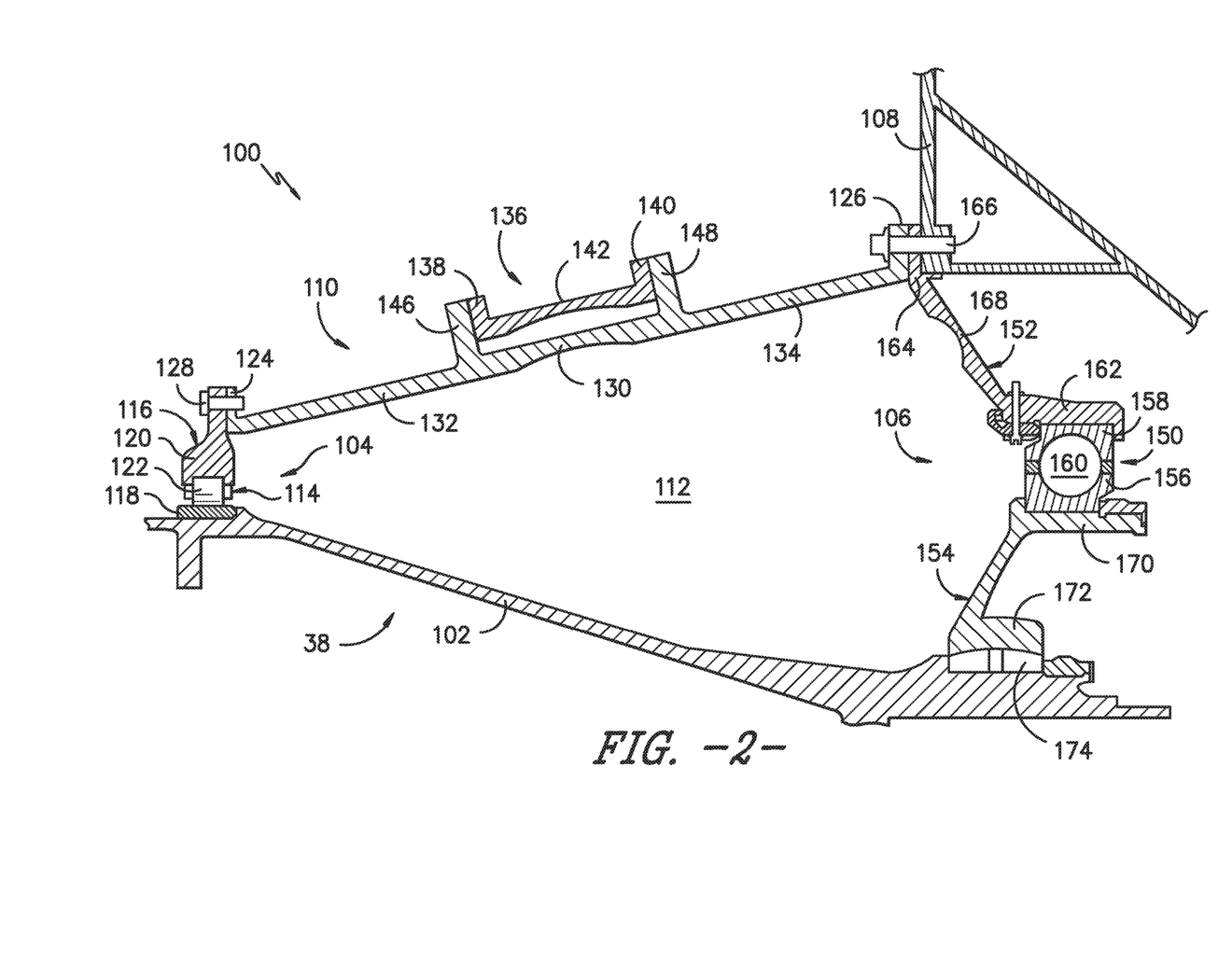
FIG. 2 illustrates a cross-sectional view of one embodiment of a rotor support system for supporting a rotor shaft of a gas turbine engine relative to corresponding support structure of the engine in accordance with aspects of the present subject matter.

Referring now to FIG. 2, a cross-sectional view of one embodiment of a rotor support system 100 suitable for use within a gas turbine engine 10 is illustrated in accordance with aspects of the present subject matter, particularly illustrating the rotor support system 100 installed relative to the fan rotor assembly 38 of the gas turbine engine 10. As shown in FIG. 2, the rotor assembly 38 may generally include a rotor shaft 102 (e.g., shaft 34 shown in FIG. 1) configured to support an array of fan blades 44 (FIG. 1) of the rotor assembly 38 extending radially outwardly from a corresponding rotor disc (not shown). The rotor shaft 102 may be supported within the engine 10 through one or more axially spaced bearing assemblies 104, 106 of the rotor support system 100, with each bearing assembly 104, 106 being configured to rotationally support the rotor shaft 102 relative to a structural support frame 108 of the gas turbine engine 10. For instance, as shown in FIG. 2, a first bearing assembly 104 may be coupled between the rotor shaft 102 and the support frame 108 via a load reduction member 110 of the rotor support system 100. Additionally, a second bearing assembly 106 may be coupled between the rotor shaft 102 and the support frame 108 at a location axially aft of the first bearing assembly 104. In several embodiments, the first bearing assembly 104 may be located at the number one bearing position within the engine 10 and may correspond to a roller bearing assembly whereas the second bearing assembly 106 may be located at the number two bearing position within the engine 10 and may correspond to a fan thrust bearing.

Figure 5:
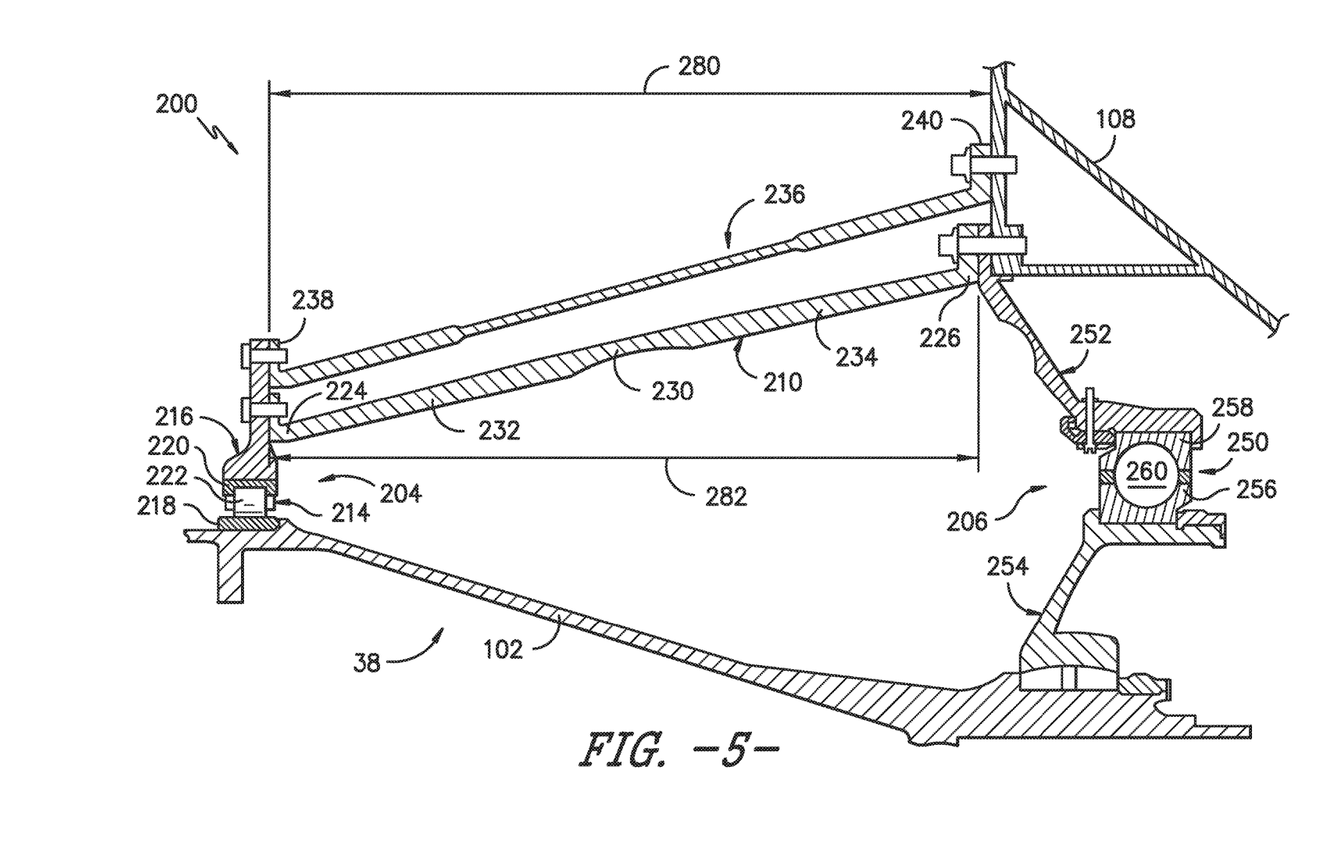
FIG. 5 illustrates a cross-sectional view of another embodiment of a rotor support system for supporting a rotor shaft of a gas turbine engine relative to corresponding support structure of the engine in accordance with aspects of the present subject matter.

As shown in the illustrated embodiment, the first and second bearing assemblies 104, 106 may generally be positioned within an annular, sealed compartment 112 of the engine 10 defined between the rotor shaft 102 and the support frame 108. In several embodiments, the first bearing assembly 104 may generally include a bearing 114 and an outer bearing housing 116 extending radially outwardly from the bearing 114. As shown, the bearing 114 may include an inner race 118, an outer race 120 positioned radially outwardly from the inner race 118 and a plurality of rolling elements 122 (only one of which is shown) disposed between the inner and outer races 118, 120. The rolling elements 122 may generally correspond to any suitable bearing elements, such as balls or rollers. In the illustrated embodiment, the outer race 120 of the bearing 114 is formed integrally with the outer bearing housing 116. However, in other embodiments, the outer race 120 may correspond to a separate component from the outer bearing housing 116 (e.g., as shown in FIG. 5). In such an embodiment, the outer race 120 of the bearing 114 may be configured to interface with and/or be coupled to the radially inner end of the outer bearing housing 116.

Additionally, as shown in FIG. 2, the outer bearing housing 116 may be configured to be coupled to the load reduction member 110 of the disclosed system 100 such that the load reduction member 110 extends lengthwise between the first bearing assembly 104 and the support frame 108. Specifically, in several embodiments, the load reduction member 110 may extend lengthwise between a first end 124 and a second end 126, with the first end 124 being coupled to the outer bearing housing 116 and the second end 126 being coupled to the support frame 108. It should be appreciated that, in the illustrated embodiment, the outer bearing housing 116 of the first bearing assembly 104 and the load reduction member 110 are shown as separate components configured to be separately coupled to one another (e.g., via a bolt 128 or other suitable fastener). However, in other embodiments, the outer bearing housing 116 and the load reduction member 110 may be formed integrally with one another.

In general, the load reduction member 110 may be configured to function as a load reduction device (LRD) for the disclosed system 100. Specifically, the load reduction member 110 may include a fuse portion 130 positioned between its first and second ends 124, 126 that is configured to fail upon application of an excessive load through the member 110. For example, as shown in FIG. 2, the fuse portion 130 is spaced apart from the ends 124, 126 of the load reduction member 100 such that the member includes a forward segment 132 extending lengthwise between the first end 124 and the fuse portion 130 and an aft segment 134 extending lengthwise between the fuse portion 130 and the second end 126. As such, when an excessive load is applied through the load reduction member 110, the fuse portion 130 may fail between the forward and aft segments 132, 134. For instance, during operation of the gas turbine engine 10, an unbalance within the engine 10 may cause significantly high radial forces to be applied through the fan section 16 of the engine 10 and into the bearing assemblies 104, 106 supporting the rotor assembly 38. If the radial force exceeds a given load threshold, the fuse portion 130 of the load reduction member 110 may fail, thereby severing the direct coupling provided between the forward and aft segments 132, 134 of the load reduction member 110. Typically, for a conventional LRD-type device, such a failure within the load reduction member 100 would result in the first bearing assembly 104 being completely decoupled from the support frame 108. However, as indicated above, the disclosed system 100 may include a load recoupling means for maintaining the connection between the first bearing assembly 104 and the support frame 108 when the fuse portion 130 of the load reduction member 110 fails.

Specifically, in several embodiments, the system 100 may include a load recoupling member 136 provided between the first bearing assembly 104 and the support frame 108 to prevent the decoupling of such components upon failure of the load reduction member 110. As shown in FIG. 2, in one embodiment, the load recoupling member 136 may be coupled to the load reduction member 110 along opposite sides of the fuse portion 130. For example, the load recoupling member 136 may extend lengthwise between a forward end 138 and an aft end 140, with the forward end 138 being coupled to the forward segment 132 of the load reduction member 110 and the aft end 140 being coupled to the aft segment 134 of the load reduction member 110. As such, when the fuse portion 130 fails, the load recoupling member 136 may provide a connection between the forward and aft segments 132, 134 of the load reduction member 110, thereby maintaining a mechanical connection between the first bearing assembly 104 and the support frame 108.

As indicated above, the load recoupling member 136 may, in several embodiments, be formed from a super-elastic shape memory alloy to allow the load recoupling member 136 to plastically deform during high loading events and then regain its original shape during normal loading events. Specifically, the shape memory alloy may allow for the load recoupling member 136 to undergo a large recoverable deformation without failing when the loads being transmitted between the support frame 108 and the rotor shaft 102 exceed the predetermined load threshold at which the fuse portion 130 of the load reduction member 110 is configured to fail (e.g., during a fan blade out (FBO) event). Such deformation may allow for a reduced support stiffness to be provided between the support frame 108 and the first bearing assembly 104 during the high loading event, thereby allowing the increased loads to be absorbed or dampened by the system 100 without requiring the support frame 108 to be completely decoupled from the first bearing assembly 104. However, when subject to the reduced system loads occurring during normal operating conditions and windmill conditions, the shape memory alloy forming the load recoupling member 136 may be configured to exhibit high stiffness, thereby allowing the load recoupling member 136 to provide increased support stiffness between the support frame 108 and the first bearing assembly 104. For instance, following a FBO event during which the fuse portion 130 of the load reduction member 110 fails and the load recoupling member 136 plastically deforms to absorb/dampen the FBO loads being loads transmitted between the support frame 108 and the first bearing assembly 104, the load recoupling member 136 may recover all the strain and return to its original high stiffness regime to provide increased support stiffness during windmill.

In general, the load recoupling member 136 may be formed from any suitable shape-memory alloy that allows the load recoupling member 136 to function as described herein. However, in a particular embodiment, the load recoupling member 136 may be formed from a super-elastic, metal-based shape memory alloy. For instance, a suitable super-elastic, metal-based shape memory alloy may include, but is not limited to, a nickel-titanium (NiTi) alloy, a NiTi-based alloy (e.g., a nickel-titanium-hafnium (NiTiHf) alloy, a nickel-titanium-vanadium (NiTiVd) alloy, a nickel-titanium-palladium (NiTiPd) alloy, a nickel-titanium-copper (NiTiCu), a nickel-titanium-niobium (NiTiNb) alloy), a nickel-aluminum-copper (Ni—Al—Cu) alloy and other non-nickel based alloys, such as titanium-niobium (Ti—Nb) alloys, copper-zinc-aluminum (CuZnAl) alloys, and copper-aluminum-beryllium (CuAlBe) alloys.

Figure 7:
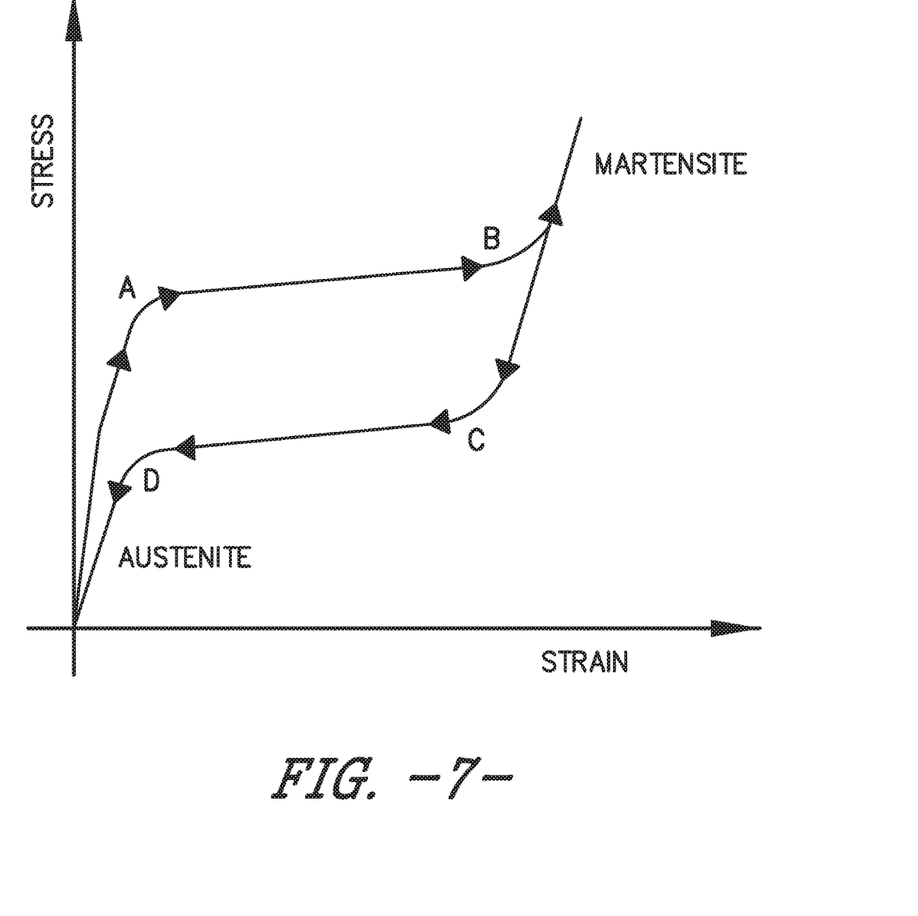
FIG. 7 illustrates a graph providing an example stress-strain curve for a suitable super-elastic shape memory alloy in accordance with aspects of the present subject matter.

It should be appreciated that, in several embodiments, the shape memory alloy utilized in accordance with aspects of the present subject matter may be selected such that the load recoupling member 136 undergoes recoverable deformation when the loads transmitted through the member 136 exceed a first load threshold and subsequently recovers back to its initial shape once the load drops below a second, lower load threshold. For instance, FIG. 7 provides an example stress-strain curve illustrating the material properties of a suitable super-elastic shape memory alloy. As shown, at a first load threshold (defined by points A and B in FIG. 7), the shape memory alloy may undergo a large strain (e.g., for NiTi, typically in the range of 2% to 4%), thereby allowing the shape-memory alloy to deform and provide reduced stiffness. In this regard, point A in FIG. 7 represents the start of the solid-solid phase transformation from austenite to martensite, and point B in FIG. 7 represents the end of this solid-solid phase transformation. Additionally, the shape memory alloy may recover all the strain once the load drops below a second load threshold (defined by points C and D in FIG. 7), thereby allowing the shape memory alloy to return back to its initial shape and provide increased stiffness. In this regard, point C in FIG. 7 represents the start of the reverse phase transformation from martensite to austenite, and point D represents the end of this reverse phase transformation. It should be appreciated that the material properties of the shape memory alloy used herein may be selected such that the first load threshold (defined by points A and B in FIG. 7) is less than, equal to or greater than the predetermined load threshold at which the fuse portion 130 is configured to fail, depending on the desired performance of the system 100.

Referring back to FIG. 2, the load recoupling member 136 may also define or include suitable features to enhance the elasticity and/or deformability of the load recoupling member 136 during high loading events and/or to increase the support stiffness of the load recoupling member 136 during normal or reduced loading conditions. For instance, as shown in FIG. 2, the load recoupling member 136 may define an area 142 of reduced thickness between its forward and aft ends 132, 134. Moreover, as will be described below with reference to FIGS. 3 and 4, the load recoupling member 136 may also define a cage-like configuration that includes circumferentially spaced ribs 144 extending between its forward and aft ends 132, 134.

It should be appreciated that, in embodiments in which the load recoupling member 136 is coupled to the load reduction member 110 along either side of the fuse portion 130, the load recoupling member 136 may generally be configured to be coupled to the load reduction member 110 using any suitable attachments means and/or methodology. For instance, as shown in the illustrated embodiment, the forward segment 132 of the load reduction member 110 may include a forward mounting flange 146 extending radially outwardly relative to the remainder of the forward segment 132 and the aft segment 134 of the load reduction member 110 may include an aft mounting flange 148 extending radially outwardly relative to the remainder of the aft segment 134. In such an embodiment, the forward and aft ends 138, 140 of the load recoupling member 136 may be configured to be coupled to the forward and aft mounting flanges 146, 148, respectively, of the load reduction member 110. For instance, the ends 138, 140 of the load recoupling member 136 may be coupled to the respective mounting flanges 146, 148 using one or more suitable mechanical fasteners, via welding and/or using any other suitable attachments means and/or methodology.

It should also be appreciated that the fuse portion 130 of the load reduction member 110 may generally have any suitable configuration that allows the fuse portion 130 to fail when the load transmitted through the load reduction member 110 exceeds the predetermined load threshold. For instance, as shown in the illustrated embodiment, the fuse portion 130 is formed by an area of reduced thickness defined between the forward and aft segments 132, 134 of the load reduction member 110. However, in other embodiments, the fuse portion 130 may have any other suitable configuration, such as by forming a fusible link between the forward and aft segments 132, 134 using an intermediate structure or a suitable joint (e.g., a bolted joint between the forward and aft segments 132, 134 including bolts or other fasteners configured shear off or otherwise fail at the predetermined load threshold).

Additionally, as shown in FIG. 2, the second bearing assembly 106 of the disclosed rotor support system 100 may include a bearing 150, an outer bearing housing 152 extending radially between the bearing 150 and the support frame 108 and an inner bearing support 154 extending radially between the bearing 150 and the rotor shaft 102. As shown in FIG. 2, the bearing 150 may generally include an inner race 156, an outer race 158 positioned radially outwardly from the inner race 156 and a plurality of rolling elements 160 (only one of which is shown) disposed between the inner and outer races 156, 158. The rolling elements 160 may generally correspond to any suitable bearing elements, such as balls or rollers.

As shown in FIG. 2, the outer bearing housing 152 may generally extend radially between an inner housing end 162 and an outer housing end 164, with the inner housing end 162 being positioned adjacent to the bearing 150 and the outer housing end 164 positioned adjacent to the support frame 108. The inner housing end 162 may generally be configured to interface with and/or be coupled to the outer race 158 of the bearing 150. Additionally, the outer housing end 164 may define a mounting flange or other suitable feature for coupling the outer housing end 164 to the support frame 108 (e.g., via bolts 166 or other suitable fasteners). For instance, as shown in FIG. 2, common bolts 166 may be used to couple both the outer housing end 164 of the outer bearing housing 152 and the second end 126 of the load reduction member 110 to the support frame 108. Alternatively, the outer bearing housing 152 and the load reduction member 110 may be coupled to the support frame 108 at separate locations and/or using separate fasteners.

Moreover, as shown in FIG. 2, the inner bearing support 154 may generally extend radially between an outer support end 170 and an inner support end 172, with the outer support end 170 being positioned adjacent to the bearing 150 and the inner support end 172 positioned adjacent to the rotor frame. For example, the outer support end 170 may generally be configured to interface with and/or be coupled to the inner race 156 of the bearing 150. Additionally, the inner support end 172 of the inner bearing support 154 may be configured to be rotatably coupled to the rotor shaft 102 (e.g., via a mounting race 174 coupled between the inner bearing support 154 and the rotor shaft 102).

It should be appreciated that, similar to the load recoupling member 136, one or both of the outer bearing housings 116, 152 of the bearing assemblies 104, 106 may also be formed from a super-elastic shape memory alloy. For instance, in several embodiments, each outer bearing housing 116, 152 may be formed from a suitable super-elastic shape memory alloy to allow the outer bearing housing 116, 152 to undergo a large recoverable deformation during high loading events but maintain sufficient support stiffness for its respective bearing assembly 104, 106 during normal or reduced loading conditions. As such, during a FBO event or other extreme loading event, the shape memory alloy of the outer bearing housings 116, 152 may deform to provide additional load damping within the system 100. In addition, one or both of the outer bearing housings 116, 152 may also define or include suitable features to enhance the elasticity and/or deformability of the housing(s) 116, 152 during high loading events. For example, as shown in FIG. 2, the outer bearing housing 152 of the second bearing assembly 106 may define an area 168 of reduced thickness between its inner and outer housing ends 162, 164.

Figure 3:
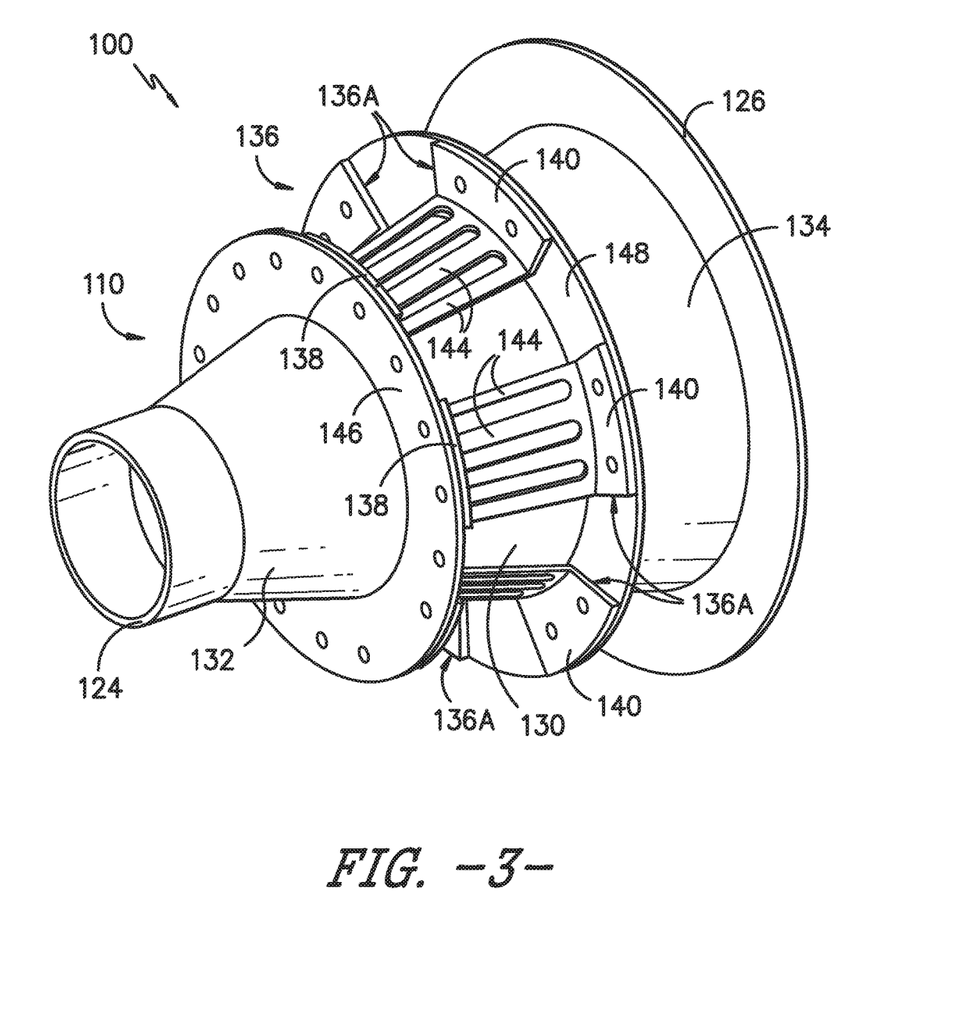
FIG. 3 illustrates a perspective view of one embodiment of a load reduction member and a load recoupling member of the rotor support system shown in FIG. 2 in accordance with aspects of the present subject matter, particularly illustrating the load recoupling member being formed from a plurality of circumferential segments spaced apart around the load reduction member.
Figure 4:
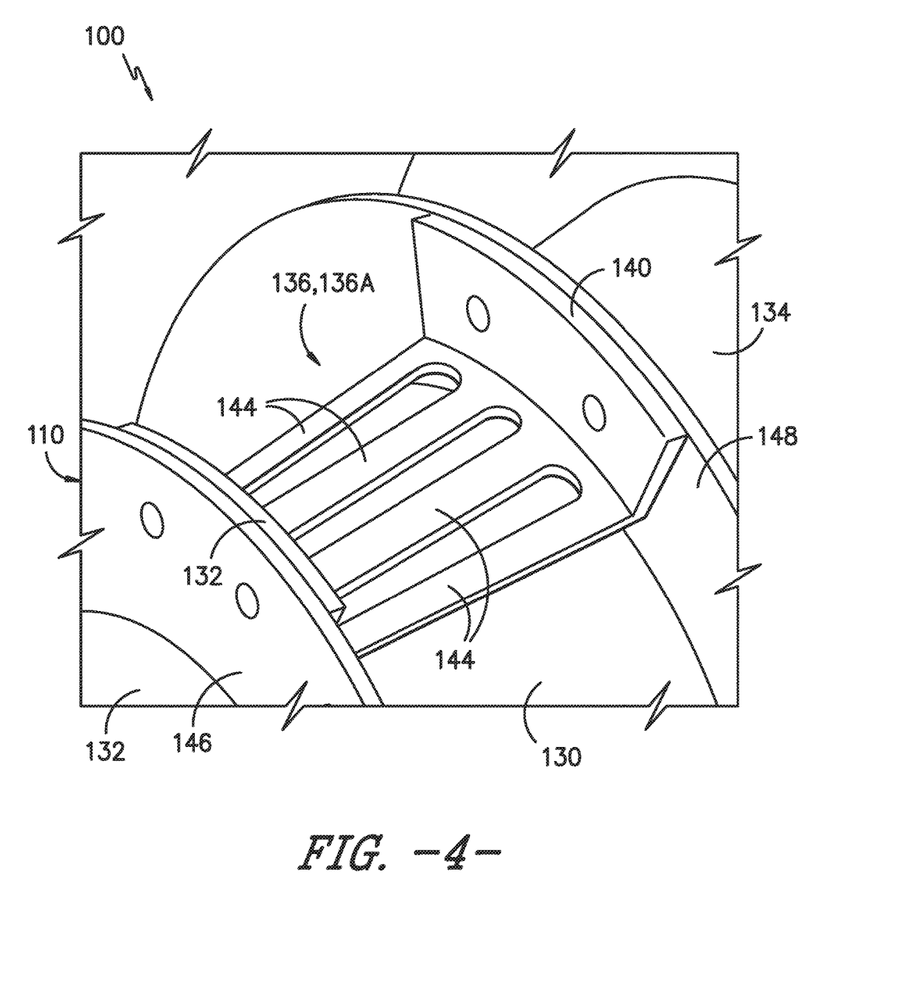
FIG. 4 illustrates a partial, perspective view of the load reduction member and the load recoupling member shown in FIG. 3.

Referring now to FIGS. 3 and 4, one embodiment of both a structural configuration and a mounting configuration for the load recoupling member 136 described above is illustrated in accordance with aspects of the present subject matter. Specifically, FIG. 3 illustrates a perspective view of the load reduction member 110 shown in FIG. 2 with the load recoupling member 136 being installed thereon. Additionally, FIG. 4 illustrates a close-up view of a portion of the load reduction member 110 and the load recoupling member 136 shown in FIG. 3.

As shown in FIGS. 3 and 4, in one embodiment, the load recouping member 136 may have a split-cage configuration. Specifically, as shown in FIG. 3, the load recoupling member 136 may be formed from a plurality of circumferential cage segments 136A spaced apart from another around the outer perimeter of the load reduction member 110. In such an embodiment, each circumferential segment 136A may be formed from a super-elastic shape memory alloy and may generally extend lengthwise between a forward end 138 and an aft end 140, with the forward end 138 being configured to be coupled to the forward mounting flange 146 of the load reduction member 110 and the aft end 140 being configured to be coupled to the aft mounting flange 148 of the load reduction member 110. It should be appreciated that the specific circumferential spacing provided between each pair of adjacent circumferential cage segments 136A may generally depend on the number of segments 136A installed on the load reduction member 110 as well as the circumferential length of each segment 136A. However, in one embodiment, the circumferential cage segments 136A may be configured to be spaced apart equally around the outer perimeter of the load reduction member 110. It should also be appreciated that the specific number of segments 136A and/or the geometry of the segments 136A may be selected to allow the load recoupling member 136 to provide the desired support stiffness between the first bearing assembly 104 and the support frame 106.

Additionally, as particularly shown in FIG. 4, each circumferential cage segment 136A may include a plurality of circumferentially spaced ribs 144 extending lengthwise between its forward and aft ends 138, 140. For instance, in the illustrated embodiment, each cage segment 136A includes four ribs 144 spaced apart along the circumferential length of the segment 136A. However, in other embodiments, each cage segment 136A may include any other suitable number of ribs 144, such as by including less than four ribs or greater than four ribs. Moreover, in one embodiment, each rib 144 may be configured to define at least a portion of the area 142 of reduced thickness of the load recoupling member 136 (e.g., as described above with reference to FIG. 2).

It should be appreciated that, in other embodiments, the load recoupling member 136 may have any other suitable configuration. For instance, as opposed to a split-cage configuration, the load recoupling member 136 may have a ring-cage configuration forming a complete 360 degree ring around the outer perimeter of the load reduction member 110, such as by coupling two or more circumferential cage segments around the load reduction member 110 such that the cage segments circumferentially abut to form an annular cage structure around the entire outer perimeter of the load reduction member 110.

Referring now to FIG. 5, a cross-sectional view of another embodiment of a rotor support system 200 suitable for use within a gas turbine engine 10 is illustrated in accordance with aspects of the present subject matter, particularly illustrating the rotor support system 200 installed relative to the fan rotor assembly 38 of the gas turbine engine 10. In general, the rotor support system 200 may be configured the same as or similar to the system 100 described above with reference to FIG. 2. For instance, the system 200 may include a first bearing assembly 204 and a second bearing assembly 206, with the first bearing assembly 204 being coupled between the rotor shaft 102 and the support frame 108 via a load reduction member 210 and the second bearing assembly 206 being coupled between the rotor shaft 102 and the support frame 108 at a location axially aft of the first bearing assembly 204.

Similar to the system 100 described above, the first bearing assembly 204 may include a bearing 214 and an outer bearing housing 216 extending radially outwardly from the bearing 214, with the bearing 214 including an inner race 218, an outer race 220 positioned radially outwardly from the inner race 218 and a plurality of rolling elements 222 (only one of which is shown) disposed between the inner and outer races 218, 220. As shown in FIG. 5, unlike the first bearing assembly 104 shown in FIG. 2, the outer race 220 of the bearing 214 corresponds to a separate component configured to interface with and/or be coupled to the outer bearing housing 216 of the first bearing assembly 204. Additionally, the second bearing assembly 206 may generally include a bearing 250, an outer bearing housing 252 extending radially between the bearing 250 and the support frame 108 and an inner bearing support 254 extending radially between the bearing 150 and the rotor shaft 102. As shown in FIG. 5, the bearing 250 may generally include an inner race 256, an outer race 258 positioned radially outwardly from the inner race 256 and a plurality of rolling elements 260 (only one of which is shown) disposed between the inner and outer races 256, 258.

Moreover, the load reduction member 210 may generally extend lengthwise between a first end 224 and a second end 226, with the first end 224 being coupled to the outer bearing housing 216 of the first bearing assembly 204 and the second end 226 being coupled to the support frame 208. Similar to the system 100 described above, the load reduction member 210 may generally be configured to function as a load reduction device (LRD) for the disclosed system 200. Specifically, the load reduction member 210 may include a fuse portion 230 positioned between its first and second ends 224, 226 that is configured to fail upon application of an excessive load through the member 210. For example, as shown in FIG. 5, the fuse portion 230 is spaced apart from the ends 224, 226 of the load reduction member 210 such that the member 210 includes a forward segment 232 extending lengthwise between the first end 224 and the fuse portion 230 and an aft segment 234 extending lengthwise between the fuse portion 230 and the second end 226. As such, when an excessive load is applied through the load reduction member 210, the fuse portion 230 may fail between the forward and aft segments 232, 234.

Referring still to FIG. 5, the system 200 may also include a load recoupling member 236 provided between first bearing assembly 204 and the support frame 108 so as to maintain a mechanical connection between the first bearing assembly 204 and the support frame 108 when the fuse portion 230 of the load reduction member 210 fails. However, unlike the load recoupling member 136 described above, the load recoupling member 236 may be configured to be coupled directly between the first bearing assembly 204 and the support frame 108. For instance, as shown in FIG. 5, the load recouping member 236 may extend lengthwise between a forward end 238 and an aft end 240, with the forward end 238 being coupled directly to the outer bearing housing 216 of the first bearing assembly 204 and the aft end 240 being coupled directly to the support frame 108. As such, when the fuse portion 230 of the load reduction member 210 fails, the load recoupling member 236 may maintain a mechanical connection between the first bearing assembly 204 and the support frame 108.

As shown in FIG. 5, in embodiments in which both the load reduction member 210 and the load recoupling member 236 are configured to be coupled directly between the first bearing assembly 204 and the support frame 108, the members 210, 236 may define similar axial lengths. For instance, in one embodiment, an axial length 280 of the load recoupling member 236 may be substantially equal to an axial length 282 of the load reduction member 210. As used herein, the axial lengths 280, 282 of the members 236, 210 are substantially equal to one another when the axial length 280 of the load recoupling member 236 is equal to the axial length 282 of the load reduction member 210 plus or minus less than 20%, such as plus or minus less than 15% or plus or minus less than 10% or plus or minus less than 5%.

It should be appreciated that, similar to the load recoupling member 136 described above with reference to FIG. 2, the load recoupling member 236 may be formed from a super-elastic shape memory alloy, such as a super-elastic, metal-based shape memory alloy. As such, the load recoupling member 236 may plastically deform during high loading events and then regain its original shape during normal or reduced loading events. For instance, the shape memory alloy may allow for the load recoupling member 236 to undergo a large recoverable deformation without failing when the loads being transmitted between the support frame 108 and the rotor shaft 102 exceed the predetermined load threshold at which the fuse portion 230 of the load reduction member 210 is configured to fail (e.g., during a fan blade out (FBO) event), thereby providing for reduced support stiffness between the support frame 108 and the first bearing assembly 204 during the high loading event. However, during normal operating conditions and windmill conditions, the load recoupling member 236 may be configured to provide high support stiffness.

Figure 6:
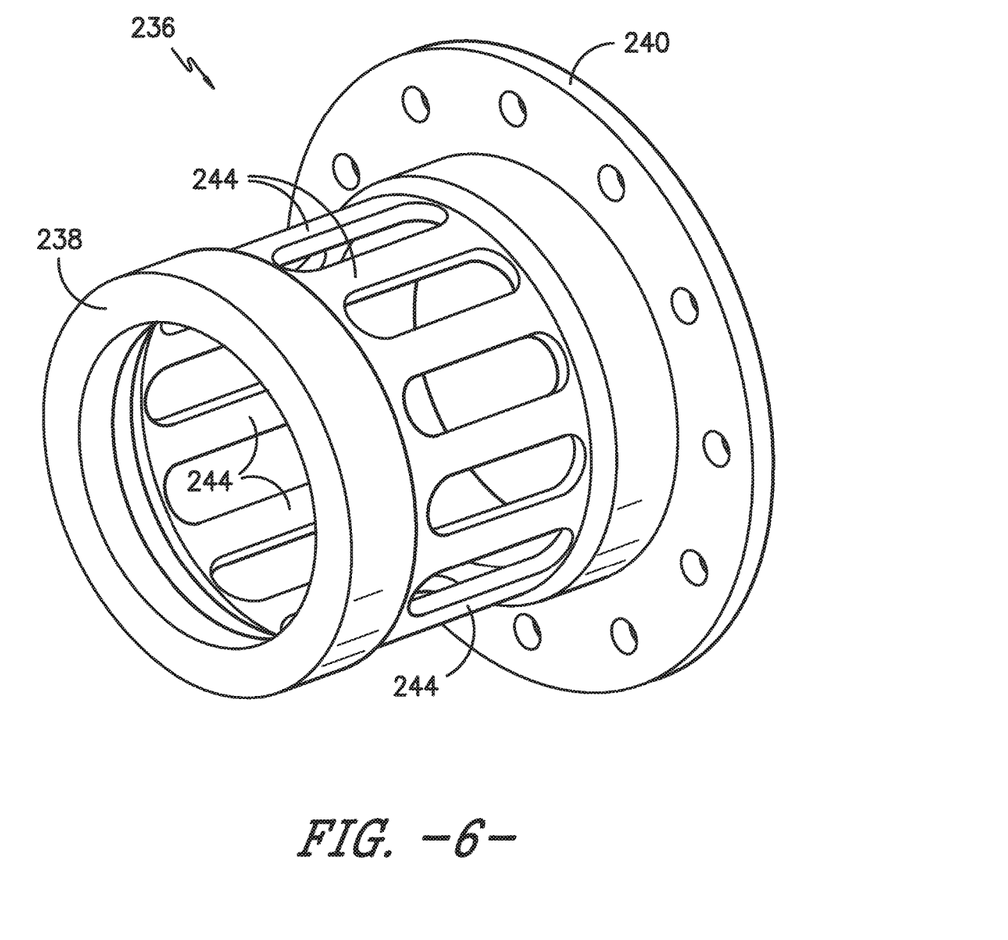
FIG. 6 illustrates a perspective view of one embodiment of a load recoupling member of the rotor support system shown in FIG. 5.

Referring now to FIG. 6, a perspective view of one embodiment of a structural configuration for the load recoupling member 236 described above with reference to FIG. 5 is illustrated in accordance with aspects of the present subject matter. As shown, the load recoupling member 236 may have a ring-cage configuration forming a complete 360 degree ring designed to extend lengthwise between the first bearing assembly 204 and the support frame 108. For instance, two or more circumferential cage segments may installed between the first bearing assembly 204 and the support frame 108 such that the segment(s) abut one another in the circumferential direction, thereby forming the annular cage structure. Additionally, given its cage-like configuration, the load recoupling member 236 may include a plurality of circumferentially spaced ribs 244 extending lengthwise between its forward and aft ends 238, 240. As shown in FIG. 6, the ribs 244 are generally spaced apart equally around the circumference of the load recoupling member 236. However, in other embodiments, the circumferential spacing of the ribs 244 may vary around the load recoupling member 236.

It should be appreciated that, in alternative embodiments, the load recoupling member 236 may have any other suitable configuration. For instance, as opposed to a ring-cage configuration, the load recoupling member 236 may have a split-cage configuration formed by two or more circumferentially spaced cage segments extending lengthwise between the first bearing assembly 204 and the support frame 108.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A rotor support system for a gas turbine engine, the gas turbine engine comprising a support frame, the rotor support system comprising:
    a bearing assembly comprising a first bearing assembly and a second bearing assembly spaced axially apart from the first bearing assembly, wherein the first bearing assembly includes a first bearing and a first outer bearing housing extending radially outwardly from the first bearing, and wherein the second bearing assembly includes a second bearing and a second outer bearing housing extending radially outwardly from the second bearing;
    a load reduction member configured to be coupled between the bearing assembly and the support frame of the gas turbine engine, the load reduction member including a fuse portion configured to fail when a load transmitted through the load reduction member exceeds a predetermined load threshold; and
    a load recoupling member provided between the bearing assembly and the support frame, the load recoupling member being formed from a super-elastic shape memory alloy that allows the load recoupling member to undergo recoverable deformation without failing when the fuse portion fails such that the load recoupling member maintains a mechanical connection between the bearing assembly and the support frame,
    wherein the first and second outer bearing housings are formed from a super-elastic shape memory alloy that allows the first and second outer bearing housings to undergo recoverable deformation without failing when the fuse portion fails.

2. The rotor support system of claim 1, wherein the load recoupling member has an initial shape prior to undergoing deformation, the load recoupling member being configured to undergo the recoverable deformation when the load transmitted through the load recoupling member exceeds a first load threshold and recover back to the initial shape once the load drops below a second load threshold, the first load threshold being higher than the second load threshold.

3. The rotor support system of claim 1, wherein the load reduction member includes a forward segment extending lengthwise between the bearing assembly and the fuse portion and an aft segment extending lengthwise between the fuse portion and the support frame.

4. The rotor support system of claim 3, wherein the load recoupling member extends lengthwise between a forward end and an aft end, the forward end being coupled to the forward segment of load reduction member and the aft end being coupled to the aft segment of the load reduction member, wherein, when the fuse portion fails, the load recoupling member remains coupled between the forward and aft segments of the load reduction member to maintain the mechanical connection between the bearing assembly and the support frame.

5. The rotor support system of claim 4, wherein the load reduction member includes a forward mounting flange extending from the forward segment and an aft mounting flange extending from the aft segment, the forward end of the load recoupling member being coupled to the forward mounting flange and the aft end of the load recoupling member being coupled to the aft mounting flange.

6. The rotor support system of claim 4, wherein the load recoupling member is formed from a plurality of circumferential segments coupled between the forward and aft segments of the load reduction member, the plurality of circumferential segments being spaced apart circumferentially from one another around an outer perimeter of the load reduction member.

7. The rotor support system of claim 1, wherein the load recoupling member extends lengthwise between a forward end and an aft end, the load recoupling member including a plurality of circumferentially spaced ribs extending between the forward and aft ends.

8. The rotor support system of claim 1, wherein the load recoupling member extends lengthwise between a forward end positioned adjacent to the bearing assembly and an aft end positioned adjacent to the support frame such that the load recoupling member defines an axial length that is substantially equal to an axial length of the load reduction member.

9. The rotor support system of claim 8, wherein the forward end is coupled directly to the bearing assembly and the aft end is coupled directly to the support frame.

10. The rotor support system of claim 1, wherein the bearing assembly corresponds to a first bearing assembly, the first bearing assembly including a first bearing and a first outer bearing housing extending radially outwardly from the first bearing.

11. The rotor support system of claim 10, further comprising a second bearing assembly spaced axially apart from the first bearing assembly, the second bearing assembly including a second bearing and a second outer bearing housing extending radially outwardly from the second bearing.

12. The rotor support system of claim 11, wherein at least one of the first outer bearing housing or the second outer bearing housing is formed from a super-elastic shape memory alloy.

13. A rotor support system for a gas turbine engine, the gas turbine engine comprising a support frame, the rotor support system comprising:
    a first bearing assembly including a first bearing and a first outer bearing housing extending radially outwardly from the first bearing;
    a second bearing assembly spaced axially apart from the first bearing assembly, the second bearing assembly including a second bearing and a second outer bearing housing extending radially outwardly from the second bearing; and
    a load reduction member configured to be coupled between the first bearing assembly and the support frame of the gas turbine engine, the load reduction member including a fuse portion configured to fail when a load transmitted through the load reduction member exceeds a predetermined load threshold,
    wherein the first and second outer bearing housings are formed from a super-elastic shape memory alloy that allows the first and second outer bearing housings to undergo recoverable deformation without failing when the fuse portion fails.

14. A gas turbine engine, comprising:
a rotor shaft;
a support frame spaced radially from the rotor shaft; and
the rotor support system of claim 13 configured to support the rotor shaft relative to the support frame.

15. The gas turbine of claim 14, wherein the rotor support system further includes a load recoupling member provided between the bearing assembly and the support frame, the load recoupling member being formed from a super-elastic shape memory alloy that allows the load recoupling member to undergo recoverable deformation without failing when the fuse portion fails such that the load recoupling member maintains a mechanical connection between the bearing assembly and the support frame, and wherein the load recoupling member has an initial shape prior to undergoing deformation, the load recoupling member being configured to undergo the recoverable deformation when the load transmitted through the load recoupling member exceeds a first load threshold and recover back to the initial shape once the load drops below a second load threshold, the first load threshold being higher than the second load threshold.

16. The gas turbine engine of claim 15, wherein the load reduction member includes a forward segment extending lengthwise between the bearing assembly and the fuse portion and an aft segment extending lengthwise between the fuse portion and the support frame.

17. The gas turbine engine of claim 16, wherein the load recoupling member extends lengthwise between a forward end and an aft end, the forward end being coupled to the forward segment of load reduction member and the aft end being coupled to the aft segment of the load reduction member, wherein, when the fuse portion fails, the load recoupling member remains coupled between the forward and aft segments of the load reduction member to maintain the mechanical connection between the bearing assembly and the support frame.

18. The gas turbine engine of claim 17, wherein the load reduction member includes a forward mounting flange extending from the forward segment and an aft mounting flange extending from the aft segment, the forward end of the load recoupling member being coupled to the forward mounting flange and the aft end of the load recoupling member being coupled to the aft mounting flange.

19. The gas turbine engine of claim 17, wherein the load recoupling member is formed from a plurality of circumferential segments coupled between the forward and aft segments of the load reduction member, the plurality of circumferential segments being spaced apart circumferentially from one another around an outer perimeter of the load reduction member.

20. The gas turbine engine of claim 14, wherein the rotor support system further includes a load recoupling member provided between the bearing assembly and the support frame, the load recoupling member being formed from a super-elastic shape memory alloy that allows the load recoupling member to undergo recoverable deformation without failing when the fuse portion fails such that the load recoupling member maintains a mechanical connection between the bearing assembly and the support frame, and wherein the load recoupling member extends lengthwise between a forward end and an aft end, the load recoupling member including a plurality of circumferentially spaced ribs extending between the forward and aft ends.

* * * * *